(12) United States Patent
Erignac

(10) Patent No.: US 9,547,805 B1
(45) Date of Patent: Jan. 17, 2017

(54) SYSTEMS AND METHODS FOR IDENTIFYING ROADS IN IMAGES

(71) Applicant: The Boeing Company, Seal Beach, CA (US)

(72) Inventor: Charles A. Erignac, Kirkland, WA (US)

(73) Assignee: The Boeing Company, Chicago, IL (US)

(*) Notice: Subject to any disclaimer, the term of this patent is extended or adjusted under 35 U.S.C. 154(b) by 233 days.

(21) Appl. No.: 13/747,007

(22) Filed: Jan. 22, 2013

(51) Int. Cl.
*G06T 1/00* (2006.01)
*G06K 9/62* (2006.01)

(52) U.S. Cl.
CPC .................................. *G06K 9/6256* (2013.01)

(58) Field of Classification Search
None
See application file for complete search history.

(56) References Cited

U.S. PATENT DOCUMENTS

| | | | | |
|---|---|---|---|---|
| 6,577,334 B1* | 6/2003 | Kawai | ................ | B60G 17/0165 348/148 |
| 7,031,927 B1* | 4/2006 | Beck | ................ | C02F 1/008 705/7.12 |
| 7,353,113 B2* | 4/2008 | Sprague | ................ | G06Q 10/06 405/36 |
| 7,636,455 B2* | 12/2009 | Keaton | ................ | G06K 9/0063 348/118 |
| 7,653,218 B1* | 1/2010 | Malitz | ................ | G06K 9/0063 382/113 |
| 8,085,166 B2* | 12/2011 | Tamir | ................ | G06Q 30/0283 340/425.5 |
| 8,155,391 B1* | 4/2012 | Tang | ................ | G06K 9/00651 382/113 |
| 8,488,845 B1* | 7/2013 | Tang | ................ | G06K 9/00651 382/113 |
| 8,594,375 B1* | 11/2013 | Padwick | ................ | 382/103 |
| 8,938,094 B1* | 1/2015 | Kehl | ................ | G06K 9/469 348/143 |
| 2002/0028019 A1 | 3/2002 | Hemiari et al. | | |
| 2002/0028021 A1* | 3/2002 | Foote et al. | ................ | 382/224 |
| 2003/0142867 A1* | 7/2003 | Holt | ................ | G06T 7/0083 382/173 |
| 2004/0032973 A1* | 2/2004 | Robeson et al. | ................ | 382/110 |
| 2005/0149235 A1* | 7/2005 | Seal et al. | ................ | 700/283 |
| 2005/0270374 A1* | 12/2005 | Nishida | ................ | G05D 1/0246 348/148 |

(Continued)

FOREIGN PATENT DOCUMENTS

DE   WO 2011/157251 A1 *  6/2010

OTHER PUBLICATIONS

Google Patent search—see search note appendix.*

(Continued)

*Primary Examiner* — Chan Park
*Assistant Examiner* — Mia M Thomas
(74) *Attorney, Agent, or Firm* — Armstrong Teasdale LLP

(57) ABSTRACT

Methods and systems described herein enable self-supervised road detection in images. The method includes receiving an image, segmenting the image into at least one fragment based at least in part on at least one pixel feature, determining, using a processor, a road likeness score for the at least one fragment based at least in part on a medial radius, and identifying roads based at least in part on the road likeness score.

20 Claims, 3 Drawing Sheets

(56) References Cited

U.S. PATENT DOCUMENTS

| | | | | |
|---|---|---|---|---|
| 2006/0013438 | A1* | 1/2006 | Kubota | B60W 40/04 382/103 |
| 2006/0239509 | A1* | 10/2006 | Saito | G06K 9/6205 382/104 |
| 2007/0014472 | A1* | 1/2007 | Ying et al. | 382/170 |
| 2007/0031008 | A1* | 2/2007 | Miyahara | G06K 9/00805 382/106 |
| 2009/0103773 | A1* | 4/2009 | Wheeler | G01S 7/4802 382/100 |
| 2009/0138497 | A1 | 5/2009 | Zavoli et al. | |
| 2009/0268946 | A1* | 10/2009 | Zhang et al. | 382/104 |
| 2010/0098297 | A1* | 4/2010 | Zhang | 382/104 |
| 2010/0098342 | A1* | 4/2010 | Davis et al. | 382/220 |
| 2010/0266161 | A1 | 10/2010 | Kmiecik et al. | |
| 2010/0328316 | A1 | 12/2010 | Stroila et al. | |
| 2011/0075882 | A1* | 3/2011 | Guo et al. | 382/100 |
| 2011/0242324 | A1* | 10/2011 | Hirose et al. | 348/149 |
| 2012/0050489 | A1* | 3/2012 | Gupta et al. | 348/46 |
| 2012/0101861 | A1 | 4/2012 | Lindores | |
| 2013/0022245 | A1* | 1/2013 | Sivertsen | G08G 1/07 382/104 |
| 2013/0101174 | A1* | 4/2013 | Meis et al. | 382/104 |
| 2014/0032271 | A1* | 1/2014 | Nordstrand | G06Q 30/0205 705/7.34 |
| 2014/0050368 | A1* | 2/2014 | Poulsen | G06K 9/00651 382/113 |
| 2014/0056485 | A1* | 2/2014 | Poulsen | G06K 9/00651 382/113 |
| 2014/0205154 | A1* | 7/2014 | De Souza et al. | 382/110 |
| 2014/0219514 | A1* | 8/2014 | Johnston et al. | 382/113 |
| 2015/0169966 | A1* | 6/2015 | Ishimaru | G08G 1/167 348/148 |
| 2015/0235095 | A1* | 8/2015 | Kawasaki | G06K 9/6292 340/435 |
| 2015/0336510 | A1* | 11/2015 | Imai | G08G 1/167 348/148 |
| 2016/0046237 | A1* | 2/2016 | Sugimoto | G08G 1/0969 348/148 |

OTHER PUBLICATIONS

Meis et al. (DE 112011101376 A5) Jun. 15, 2010.*

Haverkamp, D. "Complementary methods for extracting road centerlines from IKONOS imagery" Image and Signal Processing for Remote Sensing VIII, Sebastiano B. Serpico, Editor, Proceedings of SPIE vol. 4885 (2003) © 2003 SPIE, pp. 1-11.*

Sowmya, A. "Modelling and representation issues in automated feature extraction from aerial and satellite images" ISPRS Journal of Photogrammetry & Remote Sensing 55—2000. pp. 1-14; (34-47).*

DeLiang Wang, Bo Wu, Lin Yan, and Rongxing Li Jiangye Yuan, "Automatic Road Extraction from Satellite Imagery Using LEGION," in Proceedings of International Joint Conference on Neural Networks, Georgia, GA, 2009.

* cited by examiner

ND METHODS FOR
SYSTEMS AND METHODS FOR
IDENTIFYING ROADS IN IMAGES

BACKGROUND

The field of the invention relates generally to image processing, and more particularly, to self-supervised road detection in aerial and satellite imagery.

Aerial and satellite images may include various roads and portions of roads. The identification of roads is useful for a variety of purposes, including navigation. As roads vary in width, color, and layout, it is difficult to systematically identify roads in images. Accordingly, it would be desirable to have a self-supervised method for identifying roads in images.

BRIEF DESCRIPTION

In one implementation, a method is provided. The method includes receiving an image, segmenting the image into at least one fragment based at least in part on at least one pixel feature, determining, using a processor, a road likeness score for the at least one fragment based at least in part on a medial radius, and identifying roads based at least in part on the road likeness score.

DETAILED DESCRIPTION

The systems and methods described herein provide a technique to automatically extract roads from aerial and satellite imagery. The method uses a medial axis analysis technique to identify image components that have good road-like characteristics. An a-priori classification of the image is produced such that the classification can be used to train a classifier. The classifier learns to recognize road pixels based on exemplary components. Road pixels may then be isolated in an input image.

The subject matter described herein includes a method to detect roads in aerial or satellite imagery by training a classifier to recognize road pixels. This is a self-supervised learning method. The method includes analyzing the shape of image components by computing a roadness score. This score enables the identification of components that are very likely part of a road. Additional rules are used to label segments as vegetation and non-road. This labeling may be utilized to train a classifier. This classifier can be regressive (i.e. a roadness scoring function) or categorical (i.e. a road/non-road labeler).

Segmentation decomposes the image in coherent (uniform color/texture) components. These components are further subdivided with an oriented bounding box tree to produce subcomponents. Then each subcomponent is labeled based on its roadness score and additional rules. Finally, a classifier is trained to generalize the labeling to the whole image. Without loss of generality, four band (RGB+IR) images at one meter per pixel resolution may be used. One meter per pixel or less is desirable to effectively detect roads, although other resolutions may be used.

In some implementations, technical effects of the methods, systems, and computer-readable media described herein include at least one of: (a) receiving an image; (b) segmenting the image into at least one fragment based at least in part on at least one pixel feature; (c) determining, using a processor, a road likeness score for the at least one fragment based at least in part on a medial radius; and (d) identifying roads based at least in part on the road likeness score.

As used herein, an element or step recited in the singular and proceeded with the word "a" or "an" should be understood as not excluding plural elements or steps unless such exclusion is explicitly recited. Furthermore, references to "one implementation" of the present subject matter or the "exemplary implementation" are not intended to be interpreted as excluding the existence of additional embodiments that also incorporate the recited features. The term "fragment" or "fragments" refer to a segment or segments of an image and can include the terms "component" or "subcomponent".

Figure 1:
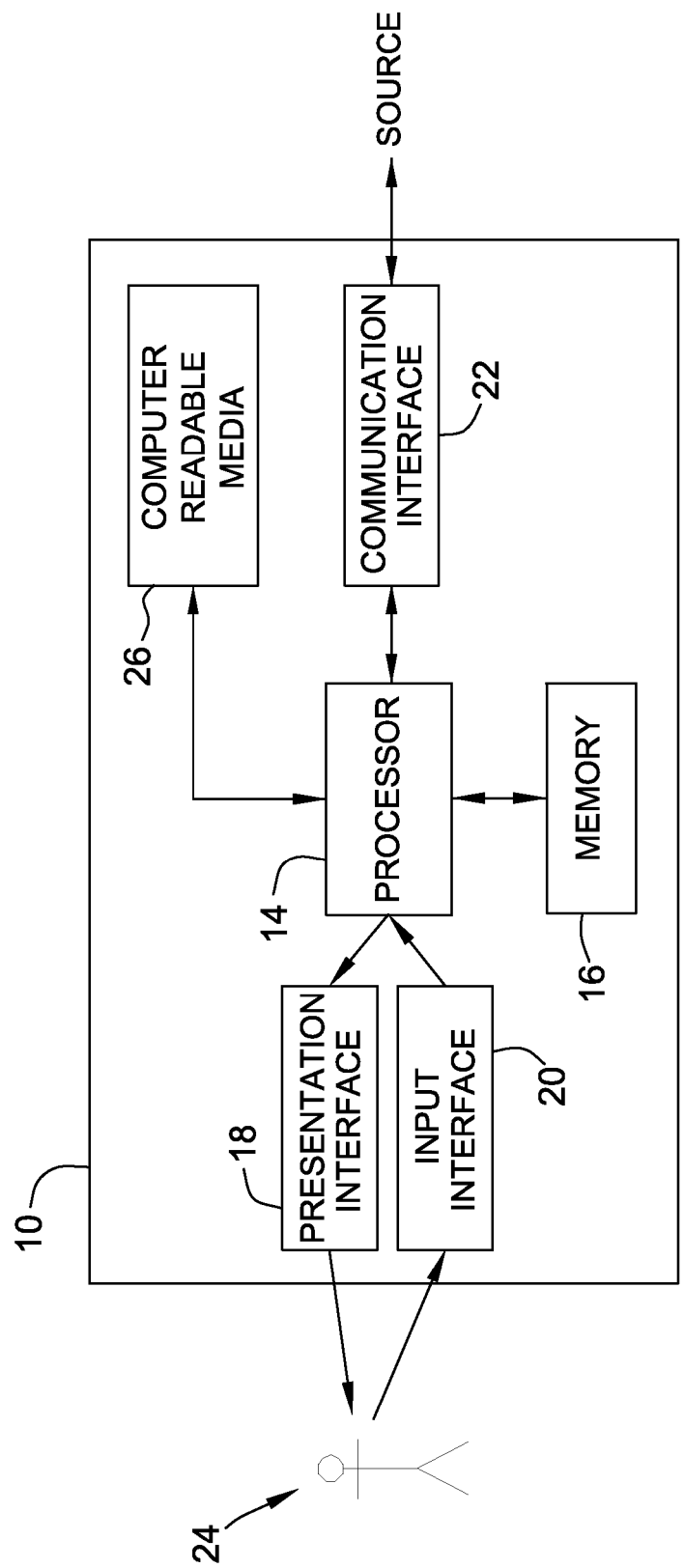
FIG. 1 is a block diagram of an exemplary computing device.

FIG. 1 is a block diagram of an exemplary computing device 10. In the exemplary embodiment, computing device 10 includes a memory 16 and a processor 14, e.g., processing device that is coupled to memory 16, e.g., memory device, for executing programmed instructions. Processor 14 may include one or more processing units (e.g., in a multi-core configuration). Computing device 10 is programmable to perform one or more operations described herein by programming memory 16 and/or processor 14. For example, processor 14 may be programmed by encoding an operation as one or more executable instructions and providing the executable instructions in memory 16.

Processor 14 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 14, cause processor 14 to perform at least a portion of the methods described herein. The above examples are exemplary only, and thus are not intended to limit in any way the definition and/or meaning of the term processor.

Memory 16, as described herein, is one or more devices that enable information such as executable instructions and/or other data to be stored and retrieved. Memory 16 may include one or more computer-readable media, such as, without limitation, dynamic random access memory (DRAM), static random access memory (SRAM), a solid state disk, and/or a hard disk. Memory 16 may be configured to store, without limitation, maintenance event log, diagnostic entries, fault messages, and/or any other type of data suitable for use with the methods and systems described herein.

In the exemplary embodiment, computing device 10 includes a presentation interface 18 that is coupled to processor 14. Presentation interface 18 outputs (e.g., display, print, and/or otherwise output) information such as, but not limited to, installation data, configuration data, test data, error messages, and/or any other type of data to an operator 24. For example, presentation interface 18, e.g., output device, may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 18 includes more than one display device. In addition, or in the alternative, presentation interface 18 may include a printer.

In the exemplary embodiment, computing device 10 includes an input interface 20, e.g., input device that receives input from operator 24. In the exemplary embodiment, input interface 20 is coupled to processor 14 and may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 18 and as input interface 20.

In the exemplary embodiment, computing device 10 includes a communication interface 22 coupled to memory 16 and/or processor 14. Communication interface 22 is provided to receive various types of data and/or information from one or more sources. Communication interface 22 may be a single device or several devices, each dedicated to one or more different type of communications.

Instructions for operating systems and applications are located in a functional form on non-transitory memory 16 for execution by processor 14 to perform one or more of the processes described herein. These instructions in the different embodiments may be embodied on different physical or tangible computer-readable media, such as memory 16 or another memory, such as a computer-readable media 26, which may include, without limitation, a flash drive, CD-ROM, thumb drive, floppy disk, etc. Further, instructions are located in a functional form on non-transitory computer-readable media 26, which may include, without limitation, a flash drive, CD-ROM, thumb drive, floppy disk, etc. Computer-readable media 26 is selectively insertable and/or removable from computing device 10 to permit access and/or execution by processor 14. In one example, computer-readable media 26 includes an optical or magnetic disc that is inserted or placed into a CD/DVD drive or other device associated with memory 16 and/or processor 14. In some instances, computer-readable media 26 may not be removable.

Computing device 10 may be implemented in a variety of forms, such as servers, virtual machines, laptops, desktops, etc. Further, in various implementations, computing device 10 may be implemented as one or more portable communication devices, such as a smartphone, a tablet, a portable computer (e.g., an iPad), a personal digital assistant (PDA), etc. Moreover, it should be appreciated that computing devices 10 described herein may include more or fewer components than are illustrated in computing device 10 of FIG. 1.

Figure 2:
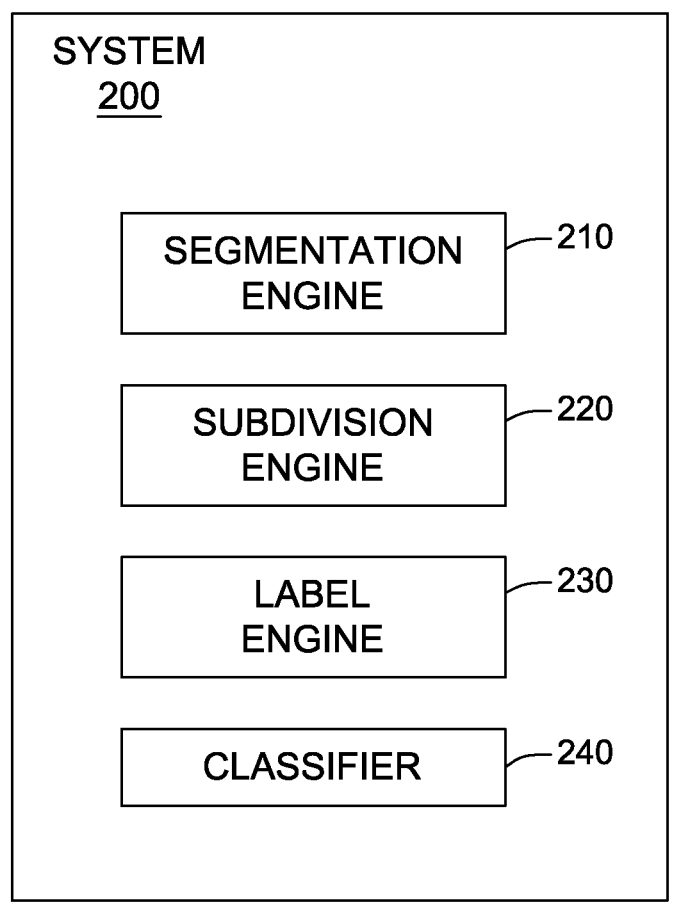
FIG. 2 is a system for analyzing images.

FIG. 2 is a block diagram of an exemplary system 200 for analyzing images. System 200 includes a segmentation engine 210. Segmentation engine 210 may use one or more image segmentation techniques. In an exemplary implementation, segmentation engine 210 receives one or more input images and decomposes the images into components that represent the objects of interest, such as roads. Segmentation engine 210 may use lower-level techniques that cluster pixels based on the similarity of certain features. K-means clustering is a technique that can be implemented to cluster pixels of similar features that may be used with, for example, 20 classes (i.e., k=20). The pixel features used as a basis for clustering may include hue, saturation, normalized difference vegetation (NDV) index, or any combination thereof. Each continuous collection, or grouping, of pixels having the same or similar features forms a component, also known as a segmentation output. Segmentation engine 210 may apply a filter, for example a 3×3 pixel median filter, to reduce noise of the segmentation output. A large number of classes may facilitate capturing the spectral diversity of an image such that the image is sufficiently subdivided into components. Alternatively, a mean-shift segmentation may also be used to decompose the image into components.

A subdivision engine 220 is configured to extract one plane, or a binary mask, from the segmentation output. The plane contains disconnected components of various shapes and sizes. Some of these components may represent road segments. Some of these components may be small and compact, while others may be large road networks with adjacent impervious surfaces such as driveways, parking lots, and roofs. An oriented bounded bounding box (OBB) tree may be used by subdivision engine 220 to decompose each component into compact subcomponents. Road segments can be separated from the adjacent surfaces into separate bounding boxes. An NDV index mask may be subtracted from each plane before subdividing in order to discard vegetation pixels. Segmentation engine 220 may close the component holes that are less than a predetermined minimum threshold. In one implementation, the predetermined minimum threshold is 25 $m^2$, however the predetermined minimum threshold can be any value that facilitates identifying roads as described herein including, but not limited to, a value in the range of 25-30 $m^2$.

Subdivision engine 220 grows the OBB tree until the leaf boxes reach a predetermined minimum density threshold or until they reach a maximum depth. In an implementation, the predetermined minimum density threshold is 0.5, however the predetermined minimum density can be any value that facilitates identifying roads as described herein including, but not limited to, a value in the range of 0.5-0.75. The density threshold may be set to a sufficiently high threshold to break-up road-networks, but not so high such that individual segments are over subdivided. In one implementation, leaf boxes whose area is less than 200-300 $m^2$ may be discarded, which advantageously eliminates components that may not be sufficiently large enough to be a portion of a road network. The remaining leaf oriented bounding boxes from the OBB trees grown on each connected component of the plane are candidate road fragments. The label assigned to a subcomponent by the segmentation step may be referred to as a k-label.

Without being limited to any particular theory, road-like fragments may have a medial axis whose medial radius is relatively constant. A road can be modeled as interconnected centerline curves that form a graph and have a varying width along those curves. The boundaries and/or dimensions of a constant width road is obtained by growing a buffer around the centerlines. The buffer's offset is half of the road width. From a shape analysis perspective, the network of centerlines can be the medial axis of the road and the medial radius, or half of the width, can be constant. Thus, a fragment representing a road can have a mean medial radius corresponding to half the road width and with a small standard deviation.

For each component, subdivision engine 220 computes the mean medial radius meanR and standard deviation stdDevR of the medial radius. The mean radius will be used to eliminate components that are too narrow or too wide to be part of the road. The standard deviation is used to compute the road likeness measure rlm of the subcomponent, as in Eq. 1.

$$rlm = 1 - (stdDevR - maxStdDevR)/maxStdDevR \quad \text{Eq. 1}$$

The variable maxStdDevR represents the maximum allowable standard deviation of the medial radius.

In one implementation, only a small part of the image may remain after the subdivision process, however, the fragments may be relatively large and are homogeneous (i.e., one dominant k-label or component type). In the exemplary implementation, a label engine 230 is configured to use a rule-based method to classify each fragment into one of a plurality of predetermined three classes. The predetermined classes can include at least: unknown, road, non-road, and vegetation. The vegetation class may be applied to the pixels that are in the NDV index mask. The label assigned to a fragment may be referred to as an r-label.

Label engine 230 may use different rules for large and regular fragments. A fragment can be considered large if its area is greater than a predetermined minimum threshold. In an implementation, the predetermined large threshold can be 2,000 m², however the predetermined large threshold can be any value that facilitates identifying roads as described herein including, but not limited to, 1,000 m² and above. A large fragment is labeled as road if its rlm is equal to or smaller than 1 and if its meanR is in an acceptable predetermined range, such as between 2 and 10. Otherwise the fragment can be labeled as non-road by label engine 230.

A regular fragment is labeled as road by label engine 230 if the aspect ratio of its oriented bounding box is above a preset minimum, such as 4, and if the narrower side of the box is smaller than a preset maximum, such as 25 pixels. Otherwise the fragment is labeled as unknown by label engine 230.

The a-priori labeling enables a classifier 240 to be trained to either score or label every pixel in the image. When configured to score pixels, classifier 240 may use regressions to compute the likelihood that a pixel is a road pixel. A road mask may be obtained by thresholding the output of classifier 240. More particularly, pixels having a score above a pre-determined threshold may be classified as roads and included in the road mask. Classifier 240 may assign a label to each pixel. When configured to label pixels, classifier 240 may be a categorical type.

Classifier 240 may use a gradient boosted tree in order to classify pixels. Thus, classifier 240 may use an ensemble method that trains a set, or a forest, of gradient boosted trees to create a training set. The training set is comprised of all the pixels whose r-label is road and an equal number of randomly selected pixels among the vegetation and non-road categories. The same pixel features used in the segmentation step by segmentation engine 210 may be used for classification: hue, saturation, and NDV index.

Experimentally, and in some implementations, for a forest size of 200 trees, for example, a tree depth in the range of 5-7 and a shrinkage value in the range of 0.001-0.002 provides optimal results. Shrinkage controls the rate at which the trees learn the data as they grow, which is similar to a learning rate. High shrinkage values can lead to overfitting. The deeper the tree, the smaller the shrinkage needs to be to prevent premature freezing of the learning process when the trees grow.

Classifier 240 may be trained using a regression gradient boosted tree classifier to learn to compute the likelihood that a pixel should be labeled as road. A squared loss function and the pixel scoring described above may be used. Classifier 240 may be configured to generalize from the training set, but since some building pixels have the same spectral signature, or features, as road pixels, some building pixels may score highly, thus producing false positives.

In some implementations, classifier 240 is configured to use a categorical gradient boosted tree classifier to learn r-labeling. Classifier 240 trains one regression classifier per category (vegetation, non-road, and road). Upon evaluation, classifier 240 outputs the label with the highest corresponding forest scores. Classifier 240 may use a deviance loss function and/or pixel scoring described herein. As in regression training, classifier 240 may be configured to generalize from the training set.

After classifier 240 has been trained, classifier 240 is configured to process one or more images and identify roads in the one or more images. Classifier 240 may score each pixel with a roadness score that represents a likelihood that the pixel is a part of a road. Alternatively, or additionally, classifier 240 may label each pixel as a road or some other object. Classifier 240 may output a mask showing pixels having a roadness score above a pre-determined threshold and/or pixels labeled as a road. Alternatively, or additionally, classifier 240 may output pixel coordinates, bounding boxes, or any other reference to the location of pixels determined to be a road.

Figure 3:
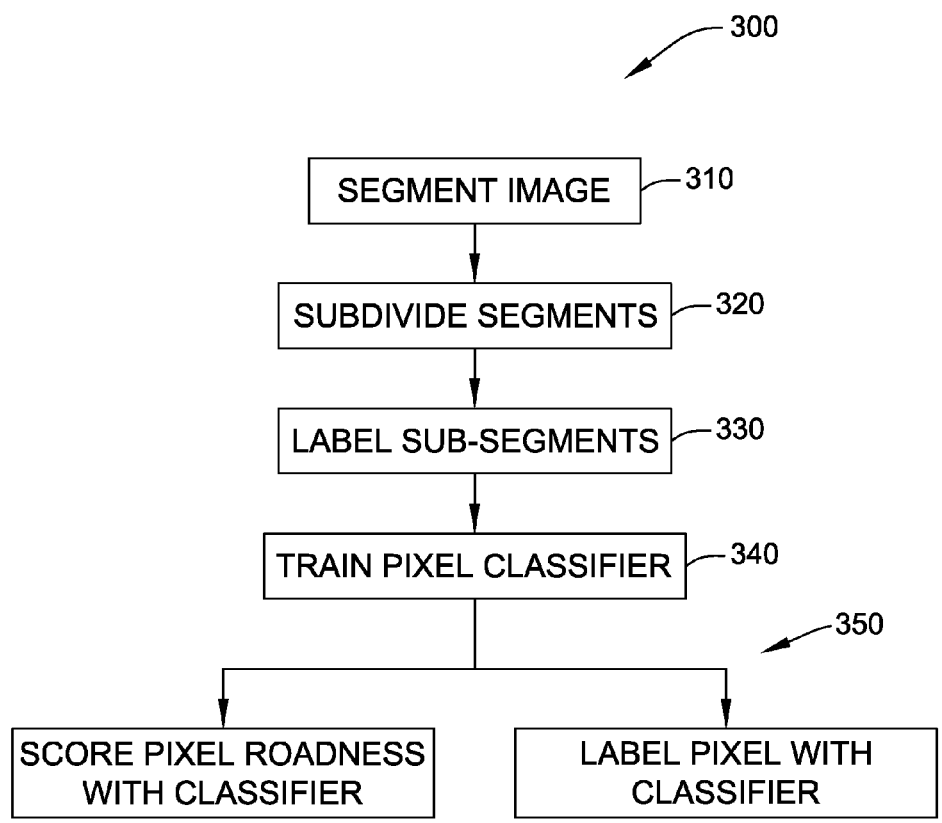
FIG. 3 is a flowchart of an exemplary method for analyzing images using the system of FIG. 2.

FIG. 3 is a flowchart of an exemplary method 300 for detecting roads in images. In operation 310, one or more images are segmented, as described herein, using at least one pixel feature. Segmentation may be accomplishing by clustering pixels based on the at least one pixel feature. The pixel features may include hue, saturation, and/or a normalized difference vegetation index. In operation 320, the segments from operation 310 are subdivided into fragments using oriented bounding boxes. In operation 330, the fragments from operation 320 are labeled as road, non-road, or unknown. In operation 340, a classifier is trained. The classifier may be trained using road likeliness pixel scores and/or using labeled fragments, as described in more detail herein. The classifier may be trained on one or more fragments. In operation 350, the classifier scores each pixel and/or labels each pixel in order to identify roads. Thus, the classifier may be trained using a subset of fragments of an image before identifying roads in the remainder of the image. Alternatively, or additionally, the trained classifier may be used on subsequent images.

The subject matter described herein, like many other image processing methods, is sensitive to the presence of shadows and occlusions in the image. Accordingly, shadow removal techniques may be applied as a pre-processing step to erase shadows. Initial segmentation may be improved as a result. Occlusions may be addressed using multi-view techniques or 3D surface models.

The methods and systems described herein may be sensitive to the amount of OBB tree subdivision applied to the segmented components. Less or no subdivision extracts quality road fragments in images, which may produce a good contrast between pavement and its surroundings. This strategy produces less accurate results where roadways are large and close to each other like with highways and in particular highway exchanges. These roadways may get segmented in large components which require further subdivision than secondary roads. To address this problem, the subdivision process may be guided with a decision function that can inhibit or force OBB tree splits. For each new OBB tree node, the function may compute the road likeness measure of the content of the node and decide whether further subdivision is needed. This adaptive approach can conserve large segments of secondary roads while decomposing complex highway networks.

It should be appreciated that one or more aspects of the present disclosure transform a general-purpose computing device into a special-purpose computing device when configured to perform the functions, methods, and/or processes described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method comprising:
   receiving an image formed from at least one of aerial or satellite imagery data;
   segmenting, via a subdivision engine, the image into at least one fragment having a medial axis and medial radiuses, wherein the medial radiuses correspond to about half the width of the at least one fragment, and wherein the segmenting is based at least in part on at least one pixel feature;
   for each of the at least one fragments, computing a mean medial radius and a standard deviation for the corresponding fragment based on the corresponding medial radiuses;
   determining, using a processor, a road likeness score for each of the at least one fragments based at least in part on the medial radiuses of the corresponding fragment and the computed mean medial radius of the corresponding fragment; and
   identifying roads in the image based at least in part on the road likeness score.

2. A computer-implemented method in accordance with claim 1, wherein segmenting the image comprises clustering pixels into segments based at least in part on at least one pixel feature.

3. A computer-implemented method in accordance with claim 2, wherein the at least one pixel feature is one of hue, saturation, and normalized difference vegetation index.

4. A computer-implemented method in accordance with claim 2, wherein segmenting the image further comprises subdividing segments into fragments.

5. A computer-implemented method in accordance with claim 4, wherein subdividing segments into fragments comprises using an oriented bounding box.

6. A computer-implemented method in accordance with claim 1, further comprising labeling each fragment as one of unknown, road, and non-road.

7. A computer-implemented method in accordance with claim 6, further comprising training a classifier using at least one labeled fragment.

8. A computer-implemented method in accordance with claim 1, further comprising outputting a binary road mask that identifies pixels in the image associated with an identified road.

9. One or more non-transitory computer-readable storage media having computer-executable instructions embodied thereon, wherein when executed by at least one processor, the computer-executable instructions cause the at least one processor to:
   receive an image formed from at least one of aerial or satellite imagery data;
   segment the image into at least one fragment having a medial axis and medial radiuses, wherein the medial radiuses correspond to about half the width of the at least one fragment, and wherein the image is segmented based at least in part on at least one pixel feature;
   for each of the at least one fragments, compute a mean medial radius and a standard deviation for the corresponding fragment based on the corresponding medial radiuses;
   determine a road likeness score for each of the at least one fragments based at least in part on the medial radiuses of the corresponding fragment and the computed mean medial radius of the corresponding fragment; and
   identify roads in the image based at least in part on the road likeness score.

10. One or more non-transitory computer-readable storage media having computer-executable instructions embodied thereon according to claim 9 wherein when executed by at least one processor, the computer-executable instructions cause the at least one processor to:
    cluster pixels into segments based at least in part on at least one pixel feature.

11. One or more non-transitory computer-readable storage media having computer-executable instructions embodied thereon according to claim 9 wherein when executed by at least one processor, the computer-executable instructions cause the at least one processor to:
    segment the image into at least one fragment based at least in part on at least one pixel feature, wherein the at least one pixel feature is one of hue, saturation, and normalized difference vegetation index.

12. One or more non-transitory computer-readable storage media having computer-executable instructions embodied thereon according to claim 9 wherein when executed by at least one processor, the computer-executable instructions cause the at least one processor to:
    subdivide segments into fragments.

13. One or more non-transitory computer-readable storage media having computer-executable instructions embodied thereon according to claim 9 wherein when executed by at least one processor, the computer-executable instructions cause the at least one processor to:
    subdivide segments into fragments using an oriented bounding box.

14. One or more non-transitory computer-readable storage media having computer-executable instructions embodied thereon according to claim 9 wherein when executed by at least one processor, the computer-executable instructions cause the at least one processor to:
    label each fragment as one of unknown, road, and non-road.

15. One or more non-transitory computer-readable storage media having computer-executable instructions embodied thereon according to claim 14 wherein when executed by at least one processor, the computer-executable instructions cause the at least one processor to:
    train a classifier using at least one labeled fragment.

16. One or more non-transitory computer-readable storage media having computer-executable instructions embodied thereon according to claim 9 wherein when executed by at least one processor, the computer-executable instructions cause the at least one processor to:
    output a binary road mask that identifies pixels in the image associated with an identified road.

17. A system for analyzing images, said system comprising:
    a computing device comprising:
        a segmentation engine configured to:
            receive an image formed from at least one of aerial or satellite imagery data; and
            segment the image into at least one fragment having a medial axis and medial radiuses, wherein the medial radiuses correspond to about half the width of the at least one fragment, and wherein the image is segmented based at least in part on at least one pixel feature; and
        a classifier configured to:
            for each of the at least one fragments, computing a mean medial radius and a standard deviation for the corresponding fragment based on the corresponding medial radiuses;
            determine a road likeness score for each of the at least one fragments based at least in part on the medial radiuses of the corresponding fragment and the computed mean medial radius of the corresponding fragment; and
            identify roads in the image based at least in part on the road likeness score.

18. A system in accordance with claim 17, wherein said segmentation engine is further configured to subdivide segments into fragments.

19. A system in accordance with claim 17, wherein said segmentation engine is further configured to subdivide segments into fragments using an oriented bounding box.

20. A system in accordance with claim 17, wherein said classifier is further configured to label each fragment as one of unknown, road, and non-road.

* * * * *